United States Patent [19]

Hsu et al.

[11] Patent Number: 5,091,255
[45] Date of Patent: Feb. 25, 1992

[54] MOLDING GRANULES, THEIR MANUFACTURE AND THEIR USE IN THE PRODUCTION OF MOLDED ARTICLES

[75] Inventors: Nelson N. C. Hsu, Stamford; Franklyn A. Ballentine, Wallingford; Mark J. Hufziger, Guilford; Roger J. Card, Stamford, all of Conn.

[73] Assignee: American Cyanamid Company, Stamford, Conn.

[21] Appl. No.: 468,525

[22] Filed: Jan. 23, 1990

[51] Int. Cl.⁵ .............. D06M 15/21; D02G 3/00; B32B 5/16; C08F 2/16
[52] U.S. Cl. .............. 428/378; 252/8.6; 428/294; 428/375; 428/392; 428/394; 428/403; 428/406; 428/902; 524/458; 524/460
[58] Field of Search .............. 428/375, 378, 265, 403, 428/294, 392, 394, 406, 902; 524/460, 458; 264/143; 252/8.6

[56] References Cited

U.S. PATENT DOCUMENTS

| | | | |
|---|---|---|---|
| 2,877,501 | 3/1959 | Bradt | 264/143 |
| 4,037,011 | 7/1977 | Hattori et al. | 524/498 |
| 4,169,186 | 9/1979 | Tazaki et al. | 428/378 |
| 4,258,101 | 3/1981 | Hornbeck et al. | 428/407 |
| 4,448,839 | 5/1984 | Morris | 428/265 |
| 4,808,481 | 2/1989 | Luxon | 428/407 |
| 4,814,373 | 3/1989 | Frankel et al. | 524/460 |
| 4,818,615 | 4/1989 | Luxon et al. | 428/378 |
| 4,851,282 | 7/1989 | Shimizu et al. | 428/407 |
| 4,882,227 | 11/1989 | Iwase et al. | 428/407 |

*Primary Examiner*—George F. Lesmes
*Assistant Examiner*—James D. Withers
*Attorney, Agent, or Firm*—Frank M. Van Riet

[57] ABSTRACT

Elongated granules of reinforcing fibers extending generally parallel to each other longitudinally within the granule substantially uniformly dispersed throughout a film forming latex binder composition. The granules provide complete dispersion of the fibers during their processing conserving physical properties of the fibers and provide improved handling and molding characteristics.

3 Claims, 2 Drawing Sheets

MOLDING GRANULES, THEIR MANUFACTURE AND THEIR USE IN THE PRODUCTION OF MOLDED ARTICLES

CROSS REFERENCE TO RELATED APPLICATIONS

This application is related to the following commonly-assigned, concurrently filed patent applications of the Applicants of the instant application.

| Ser. No. | Filing Date |
| --- | --- |
| 07/468,484, | 1/23/90 |
| 07/468,654, | 1/23/90 |
| 07/468,655, | 1/23/90, now abandoned. |

FIELD OF THE INVENTION

The present invention relates to improved reinforcing filament bundles in the form of granules and to their use in the production of molded articles having reinforcing fibers dispersed therein. More particularly, it relates to granules comprising bundles of filaments held in a substantially parallel relationship by a latex binder composition.

BACKGROUND OF THE INVENTION

Fiber-filled plastic compounds suitable for processing, such as by injection molding, have become widely used. The fibers impart many valuable characteristics to the articles so produced, foremost of which are high dimensional stability, high modulus of elasticity, high resistance to distortion by heat, high tensile strength, unusually high flexural modulus and low shrinkage during curing.

For example, thermoplastic injection molding compounds comprising bundles of glass fibers surrounded by thermoplastics and injection molding processes employing them are described in Bradt, U.S. Pat. No. 2,877,501. The Bradt patent discloses pellets comprising 15-60 wt. % glass in thermoplastic resin, e.g., polystyrene. This corresponds to 8.1%–42.9% of filaments by volume and correspondingly 91.9%–57.1% by volume of resin. Das and Moore, U.S. Pat. No. 4,477,496 disclose sized glass fiber bundles for reinforcing thermoplastics, but they do not lend themselves to injection molding. The Das et al patent disclosed using a plurality of sized glass fiber strands gathered, dried and collected for use as chopped strands for reinforcing polymeric materials. The sizing comprises a crosslinkable epoxidized thermoplastic film forming copolymer.

The technology of the Bradt patent has subsequently been extended. In addition to the styrene resins, styrene-acrylonitrile copolymer resins and styrene-butadiene copolymer resins described therein, numerous other injection-moldable thermoplastic resins, such as polycarbonate resins, acrylonitrile-butadiene-styrene terpolymer resins, poly(ethylene terephthalate) resins, polysulfone resins, polyphenylene ether resins, polyetherimide resins, nylon resins, and the like, have been effectively reinforced by glass fibers.

Moreover, instead of glass fibers, subsequently developed commercial products are reinforced with filaments of carbon fibers, graphite fibers, aramid fibers, stainless steel filaments and other, as well as mixtures of any of the foregoing, many such products stemming directly from the technology disclosed in the above-mentioned U.S. Pat. No. 2,877,501. Such technology involves providing elongated granules, each of the granules containing a bundle of elongated reinforcing filaments and a thermoplastic molding composition binding the bundle. In the process of injection molding, such granules are forced into a mold, wherein the filaments are dispersed and produce molded articles with improved properties in comparison with the molded thermoplastic alone.

Prior art processes for making filament-filled granules generally require a compounding/pelleting step, in which the thermoplastic material is mixed with filaments, usually in the form of chopped bundles of filaments, and usually in an extruder. The extrudate is then chopped and formed into molding granules. Such equipment is not readily available to the molder, and a number of specialty compounders have established businesses in which fibers from one source, and thermoplastics from another source are formulated into such granules in drums or truckloads for sale to molders. It is desirable for such molders to by-pass the need for such compounders and permit molders to feed mixtures of thermoplastics and fibers directly into the molding press hopper achieving fiber dispersion by shear forces at the screw, nozzle, check valve, runners, gates, etc., in the injection molding machine. It would also be desirable to use very little resin in the pellets and high filament loadings while maintaining fiber bundle integrity and ready dispersibility. The fibers of the filament bundles should not separate during chopping and tumbling with the reduced volume fractions or resin. Moreover, there should be little tendency to degrade if the temperature is raised to lower viscosity and thereby enhance fiber dispersion. In addition, individual fibers should not become airborne and cause problems in handling due to premature breakage of the granule.

In copending commonly assigned U.S. patent application Ser. No. 233,582, filed Aug. 18, 1988, now U.S. Pat. No. 4,944,965 are disclosed improved elongated granules which solve such problems by substituting for the thermoplastic matrix which separates, coats and binds the fiber bundles as in the Bradt patent a much thinner layer of an efficient thermoplastic adhesive. In contrast to the crosslinkable film-forming adhesive to the Das et al patent, which is intended to be incompatible with the thermoplastic to be reinforced, a compatible, wholly uncrosslinkable thermoplastic adhesive is to be used in the above-identified application as the binder resin. A binder resin composition particularly exemplified in the copending application is a poly(ethyl oxazoline). While this is generally satisfactory to hold the bundles together during chopping and transporting to the blender and injection molding machine, it has been observed that the granules could, under certain handling conditions, break apart during vacuum transport, which is a method very commonly used to move the elongated granules from storage to the injection molding machine feed hopper. The breaking of the granules leads to non-uniform distribution of the fibers in the ultimate molded article, and this in turn leads to low reinforcement of said molded article. Further, when metal fibers or metal-coated fibers are used, reduced attenuation of electromagnetic interference results, an undesirable result if the molded article is to be used in an application requiring its electrical shielding ability.

In commonly assigned co-pending U.S. Ser. No. 07/344,797, filed Apr. 26, 1989, now abandoned, are also disclosed improved elongated granules containing a film-forming thermoplastic polycarbonate binder. While these granules constituted an improvement over those of the prior art, their utility is limited to incorporation into thermoplastic resins which are compatible with the polycarbonate binder. Further, application of the polycarbonate resin to the fibers during granule production requires additional processing steps which should be avoided, if possible, such as the use and recovery of chlorinated organic solvents.

In accordance with the present invention, superior latex binder compositions have now been found. These will bind the fiber bundle together sufficiently to prevent said bundles breaking during chopping into pellets and tumbling with granules of the resin to be reinforced.

As will be seen, the binder resin compositions of this invention permit the molding process itself to be used to disperse the resin uniformly throughout the molded article thus avoiding the compounding/pelletizing step.

Moreover, through of the present invention greater and more uniform dispersions of the fibers are achieved, thereby permitting superior electromagnetic shielding to be obtained at equal load levels when using electrically conductive fibers, such as nickel coated graphite fibers. Further, the use of a latex binder simplifies the processing steps of application of the binder composition to the fibers since it involves the use of an aqueous dispersion.

SUMMARY OF THE INVENTION

In accordance with the invention, there are provided molding granules convertible to a molded article through their use in conjunction with a molding resin, said granules comprising a bundle of elongated reinforcing fibers extending generally parallel to each other longitudinally within the granule and a film forming latex binder composition, the latex composition substantially surrounding each fiber within said bundle.

There are further provided in accordance with the present invention molding granules convertible to a molded article through their use in conjunction with molding resin, said granules comprising a bundle of elongated reinforcing fibers extending generally parallel to each other longitudinally within the granule and a film forming latex binder composition which substantially surrounds each fiber within said bundle, said latex binder composition being selected from those of the formula (i) a styrene/methylmethacrylate/butyl acrylate/methacrylic acid wherein the styrene content ranges from about 40 to about 60 wt. %, the methylmethacrylate content ranges from about 20 to about 45 wt. %, the butylacrylate content ranges from about 1 to about 35 wt. % and the methacrylic acid content ranges from about 0.1 to about 2.0 wt. %;

(ii) a styrene/methylmethacrylate/ethyl acrylate wherein the styrene content ranges from about 18 to about 30 wt. %, the methylmethacrylate content ranges from about 65 to about 77 wt. % and the ethylacrylate content ranges from about 2 to about 8 wt. %; and (iii) a methylmethacrylate/butylacrylate/methacrylic acid wherein the methylmethacrylate content ranges from about 50 to about 70 wt. %, the butylacrylate content ranges from about 30 to about 40 wt. % and the methacrylic acid content ranges from about 1 to about 5 wt. %.

Also contemplated by the invention are mixed molding compositions comprising:

(i) molding resin; and (ii) elongated granules comprising about 50-85% by weight of reinforcing fibers extending generally parallel to each other longitudinally through each of the granules and substantially uniformly dispersed throughout the granule in from 15-50% by weight of a film forming latex binder composition.

It is a further feature of the invention to provide a method for manufacturing molding granules comprising the steps of continuously passing reinforcing fibers through one or more baths of an aqueous film forming latex binder composition, as defined above, to impregnate the filaments, passing the impregnated filaments through means, such as grooved rollers or a sized opening to remove any excess binder composition, passing the impregnated fibers into a heating zone to evaporate any excess water and fuse the latex, withdrawing the coated fiber from the heating zone and thereafter chopping the coated fiber into elongated granules, whereby there are produced the granules claimed herein.

In still another aspect, the present invention contemplates as an improvement in the process of injection molding, the step of introducing into a mold a injection molding composition comprising a blend of:

(i) molding resin; and (ii) an amount effective to provide reinforcement of the final molded article of elongated granules, each of the granules containing a bundle of reinforcing fibers extending generally parallel to each other longitudinally within the granule substantially uniformly dispersed in a film forming latex binder composition as defined above which substantially surrounds each of the fibers.

In yet another aspect, the present invention is directed to specific latex binder compositions which are preferably used in the practice of the present invention.

DETAILED DESCRIPTION OF THE INVENTION

Fibers useful in the present invention are electrically non-conductive fibers. The identity of such fibers useful in the practice of the present invention is not critical so long as such fibers are substantially inert with respect to the latex binder composition, its aqueous solvent used during its application and the resin(s) into which the fibers are to be incorporated during the production of molded articles. The fibers must further not be unduly degraded by the temperatures encountered during the preparation of the claimed granules or during their use in the production of articles therefrom.

Fibers useful in the present invention include Kevlar ® fibers, glass fibers and mixtures thereof.

The fibers are utilized in the form of continuous yarns or tows, the dimensions and characteristics of which will vary according to the identity of the fiber. Typically, carbon, graphite and metal-coated fibers contain about 3,000 to about 48,000 fibers per tow. Stainless steel fibers, however, usually contain from 500 to about 1500 fibers per tow. The number of fibers per tow is also not critical to the practice of the present invention. However, the strength of the fiber tows used in the production of the claimed granules varies directed with tow diameter. Typically, glass fibers contain about 100–300 filaments per tow.

Figure 1:
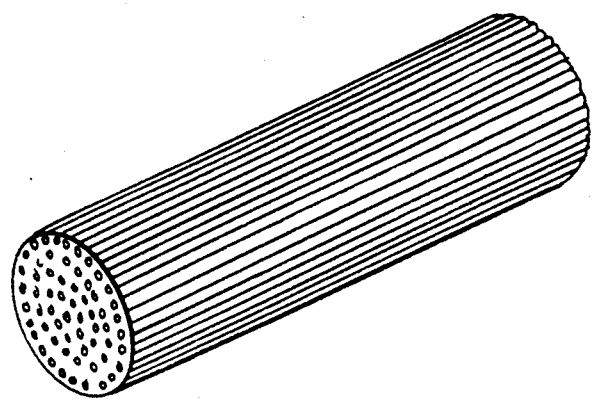
FIG. 1 is a view of a molding granule according to this invention.
Figure 2:
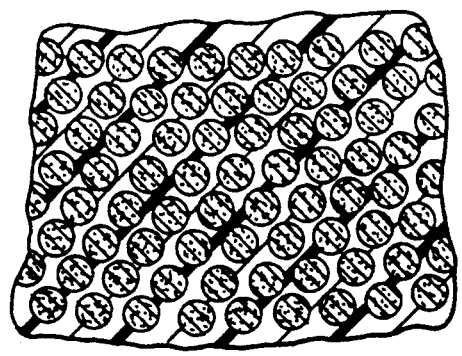
FIG. 2 is a cross-section of a molding granule of this invention on an enlarged scale.

Referring to FIGS. 1 and 2, substantially each filament contained in the injection molding granule of the present invention is surrounded by and the bundle is impregnated by the thermally stable, film forming thermoplastic binder resin composition. The granule itself may be of cylindrical or rectangular or any other cross-sectional configuration, but preferably is substantially cylindrical. The length of a granule can vary, but for most uses, ⅛ inch–1.0 inch is acceptable and ⅛ inch–¼ inch is preferred.

The latex binder compositions useful in the practice of this invention are those which possess the following qualities.

A. Glass Transition Temperature

The latex compositions useful in the practice of the claimed invention should possess glass transition temperatures (Tg) in excess of those temperatures which are to be encountered during production of the fiber-containing final article. This is to avoid granule degradation during resin drying which typically preceeds compounding or molding of a final fiber-containing article. Low Tg's produce granule break-down and fiber release or granule agglomeration, both of which need to be avoided during processing. While Tg's will therefore depend upon the resins with which the granules are to be used, the Tg of the latex is preferably about 100° C. or higher.

B. Particle Size

The particle size of the latex must be sufficiently small to allow for complete penetration of the fiber tow by the latex during its application. Application of latexes having particle sizes that are too large result in the production of tows wherein the latex does not reach the interior of the tow in sufficient quantities to uniformly coat interior fibers. Granules produced from such tows may be subject to breakage during chopping or molding operations. Particle size may be controlled through use of various surfactants during latex preparation. Aerosol ®501, produced by American Cyanamid Company, is preferred in this regard. Preferred particle sizes of the latex dispersion are about 0.1 micron or less. Most preferably, particle sizes are about 0.1 micron.

C. Resin Compatibility

The latexes of the present invention must be compatible with the resin used in the production of the molded articles. As used herein, compatibility should be understood to mean that the latex may not be incompatible with such resins to the extent that manufacturing defects are produced in the molded articles or undue processing difficulties encountered. Styrene is preferably employed in the latex composition due to its compatibility with a broad range of common molding resins.

D. Toughness

The latex, once fused onto the fibers of the tow with which it has been contacted, must be sufficiently tough to withstand the physical requirements encountered during chopping of the tow, transport and storage of the granules and granule molding or compounding without prematurely releasing the fibers which it coats. Latexes producing unduly brittle granules are therefore not satisfactory.

Nevertheless, such fibers must still be released at the appropriate time, presumably through the application of heat in the presence of a thermoplastic resin during production of articles therefrom. Moreover, such release should be complete such that good dispersion of the fibers in said article is achieved.

The polymer latex of the instant invention is made preferably by a gradual addition thermal process following conventional emulsion polymerization procedures such as taught in the books entitled "Emulsion Polymerization" by D. C. Blackley (Wiley, 1975) and S. A. Bovey et al (Interscience Publishers, 1965) both herein incorporated by reference. The latex binder is preferably a linear polymer free of crosslinks and branch points.

Preferably, the latexes used in the present invention comprise a majority of styrene and methylmethacrylate. Both compounds have glass transition temperatures of at least 100° C. and styrene is compatible with most molding resins. Preferably, these compounds are present in a ratio of styrene:methylmethacrylate ranging from about 0.30 to about 1.9. Most preferably, the ratio is about 1.0 to about 1.5. The balance of this preferred latex may be composed of other compounds which lead to a composition having qualities (A)–(D) above. Compounds such as butylacrylate, ethylacrylate, methacrylic acid and mixtures thereof may therefore be used. Butylacrylate, ethylacrylate or butylmethacrylate, if used, is preferably present in amounts of about 1 to about 7.5 wt. %, most preferably about 3 wt. % based on the total weight of the latex monomers. If methacrylic acid is used, it is preferably present in amounts ranging from about 0.25 to 1 wt. %, most preferably about 0.5 wt. % on the same basis. The latex will also contain quantities of the catalyst(s) and surfactant(s) used in the preparation of the latex dispersion.

Particularly preferred in the practice of the present invention are latex compositions containing (i) a styrene/methylmethacrylate/butyl acrylate/methacrylic acid wherein the styrene content ranges from about 40 to about 60 wt. %, the methylmethacrylate content ranges from about 20 to about 45 wt. %, the butylacrylate content ranges from about 1 to about 35 wt. % and the methacrylic acid content ranges from about 0.1 to about 2.0 wt. %;

(ii) a styrene/methylmethacrylate/ethyl acrylate wherein the styrene content ranges from about 18 to about 30 wt. %, the methylmethacrylate content ranges from about 65 to about 77 wt. % and the ethylacrylate content ranges from about 2 to about 8 wt. %; and (iii) a methylmethacrylate/butylacrylate/methacrylic acid wherein the methylmethacrylate content ranges from about 50 to about 70 wt. %, the butylacrylate content ranges from about 30 to about 40 wt. % and the methacrylic acid content ranges from about 1 to about 5 wt. %. Specific latexes which may be used in the practice of the present invention are set forth in the Examples which appear below.

The polymer latex binder forms a film on the fibers having excellent adhesion and flexibility, thus providing a hard, protective film substantially unaffected by the abrasive action, humidity, molding and compounding processing apparatus. Release of the binder is accomplished through the application of heat, thereby allowing for fiber dispersal within a thermoplastic molded article.

The amount of binder applied to the fibers may vary from about 20 to about 50% by weight depending on the purpose for which the application is intended and on the identity and therefore weight of the fiber. The latex may be applied by spraying, dipping, padding by sizing rolls, transfer rolls or the like. An entire tow may be passed through a conventional slasher bath or may be individually treated in a single end sizer. Preferably, the tow is passed through a bath at a linear speed of about 5-30 ft./minute. The aqueous latex may be applied at room temperature or at elevated temperatures such as up to about 80° C. The latex may have a concentration of 20-80% by weight solids in the aqueous system, preferably 40-60% by weight, and excess may be removed, such as by squeeze rolls, a die or wipers, and the treated tow may then be dried.

Drying may be effected by any suitable means such as by heated air drying cans. Drying may be effected at a wide range of temperatures such as from 300°-450° F., preferably about 400° F.

Production of granules from the latex-coated tows described hereinabove is accomplished by means of a cutter mechanism. Preferably, a heater or oven is employed to raise the temperature of the latex and soften the tow just prior to its contacting the cutter mechanism.

The length of the elongated granules so produced will generally range from ⅛ to 1.0 inch, preferably from ¼ to ½ inch. The diameters of each elongated granule can vary, depending primarily on the number of filaments and the thickness of each filament in the bundle. Typically, thicknesses will vary from about one-forty eighth to about three-sixteenths inch in diameter. Preferably, the diameter will be in the range of from about one-thirty-second to about one-eighth inches in diameter. In practice substantial variations of the pellet size is permissible and is generally selected on the basis of efficient mixing of the granules with the particles of injection molding resin these both depending on the molding machine being used and the physical dimensions of the article being formed.

Figure 3:
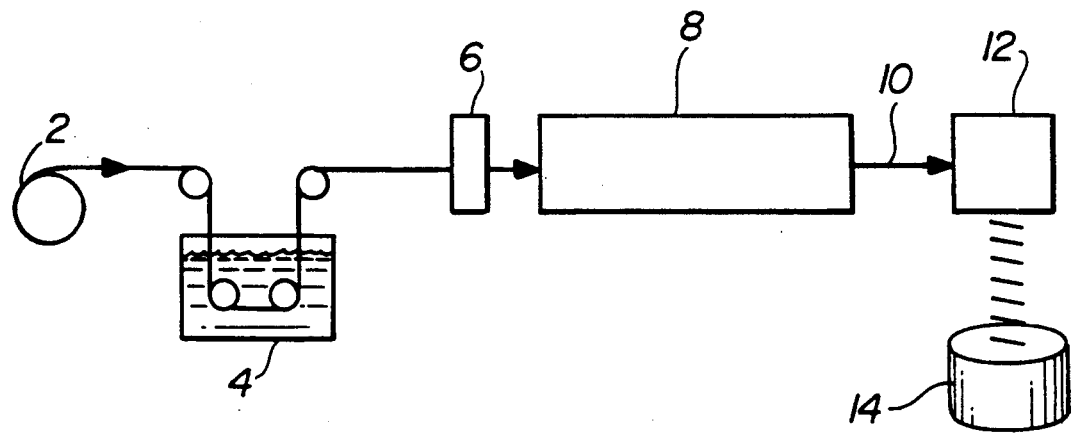
FIG. 3 is a diagram of a suitable apparatus for the continuous production of the granules of this invention.

A suitable apparatus for the continuous production of the claimed granules is shown in FIG. 3. Typically, bundles of filaments, such as graphite fiber tows or metal-coated graphite fiber tows are drawn from storage roller 2 and passed through one or more baths 4, containing the latex binder resin in an aqueous medium to impregnate the filaments, then through means 6 to control pick up. The impregnated filaments thereafter are passed into a heating zone, e.g., oven 8, to evaporate the solvent and then to fuse the latex binder resin particles. The treated filaments 10 are withdrawn from the heated zone, transported to chopper 12 while still warm and cut into fiber pellets illustratively varying between ⅛-¼" according to the requirements of the particle apparatus. Optionally, a second heating means, e.g. an oven (not shown), may be used to assure that the latex is sufficiently soft to avoid its shattering during the chopping operation. The pellets may then be stored in a suitable container 14 for subsequent use. Additional additives for promoting even distribution of the binder resin may be deposited on the tows from separate baths, but conveniently they will be included in the single bath with the latex dispersion. It will be observed that this procedure results in the orientation of the reinforcing fibers along one axis of the granule.

The amount of non-filament material (binder) in the fiber-containing granules of the invention will vary, but in general, will range from 10 to 50% by weight with any fiber, preferably from 15 to 40% by weight.

Numerous thermoplastic injection molding resins can be employed with the elongated granules of the present invention. In general any resin that can be molded and that can benefit from a uniform dispersion of fibers can be used. For example, the resins can comprise an aromatic polycarbonate resin, a polyamide resin, an ABS resin and mixtures of any of the foregoing resins, a foamable composition containing any of them or a flame retarded composition comprising any of them. All of these resins are well known and most are commercially available. See, for example, the disclosure in Hartsing, Jr., U.S. Pat. No. 4,503,158 and the examples set forth hereinafter.

Figure 4:
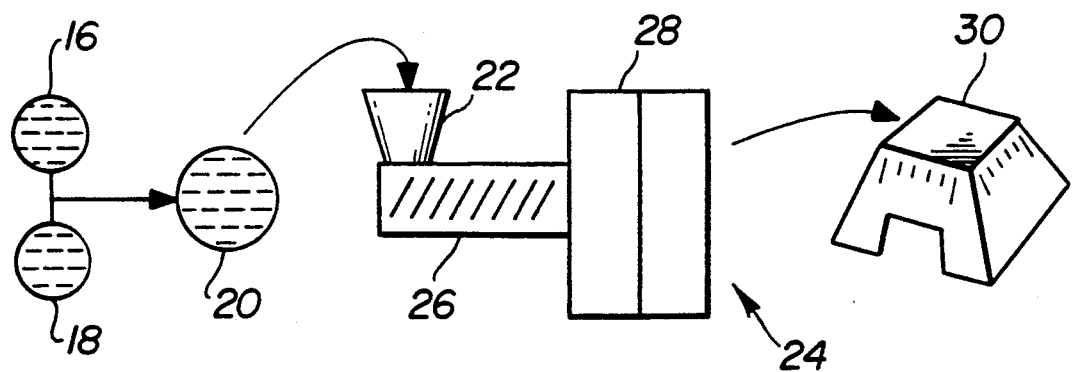
FIG. 4 is a flow diagram illustrating the use of the granules of this invention to prepare molded articles.

As a specific example of the use of the present invention, a flow diagram showing the use of the claimed granules in injection molding is presented in FIG. 4. Fiber pellets 16 are mixed with resin pellets 18 to produce a blended mixture 20. This is added to conventional hopper 20 on molding press 24. When passing through cylinder 26, prior to being forced into mold 28 a uniform dispersion of the fibers is accomplished. Removal of molded article 30 provides a fiber reinforced item produced according to this invention.

It is understood that plasticizers, mold lubricants, coloring and blowing agents and the like, can be included, and that the amount of reinforcement in the components can be varied according to well-understood techniques in this art.

DESCRIPTION OF THE PREFERRED EMBODIMENTS

The following are examples of the present invention but are not to be construed to limit the claims in any manner whatsoever.

EXAMPLES

Definitions

"sty" shall mean styrene.
"mma" shall mean methylmethacrylate.
"ba" shall mean butylacrylate.
"maa" shall mean methacrylic acid.
"ea" shall mean ethylacrylate.
"bma" shall mean butylmethacrylate.
"nk tow" shall mean a tow composed of $n \times 1000$ filaments.

EXAMPLE I

A 12K tow of graphite fibers are electroplated with nickel in accordance with the procedure set forth in U.S. Pat. No. 4,609,449. Analysis reveals that the fibers process a nickel content of about 40 wt. %.

An aqueous latex dispersion is prepared in the following manner: Water (20 gal.), and Aerosol ®501 surfactant (1 gal.) is introduced into a reaction vessel having a volume of about 60 gal. and fitted with a stirring device located therein. In a separate vessel, the monomer components of the latex are mixed in quantities such that the dispersion will contain about 50 wt. % solids. The monomers are sty, mma, ba and maa in wt. % of 54.1;42.7;2.7;0.5, respectively.

The reaction vessel is then sparged with nitrogen. A solution of ammonium persulfate (47.7 g/liter) is then introduced into the reaction vessel. The monomer solutions is then introduced into the reaction vessel dropwise over a period of about 2-3 hours with stirring of the reactor contents. Temperature of the reactor is maintained at about 85°-95° C. Following complete addition of the monomers, stirring is continued for 0.5-1.0 hours.

The contents of the reactor are then cooled to room temperature and are filtered. The dispersion is found to contain about 50% solids by weight. The latex dispersion is then introduced into a bath vessel such as is schematically represented by tank 4 in FIG. 3. The bath vessel has approximate dimensions of about 27"×16"×6" and guides are arranged therein such that a tow passing over such guides will contact the contents of the bath over a distance of about 15 inches.

The above-described fiber is then passed through the bath at a linear fiber speed of about 11 ft./minute. The fiber now coated with the aqueous latex dispersion is then introduced into a drying oven which acts to remove water from the dispersion and fuse the latex particles on the tow. The tow is then passed through the "cat puller," the apparatus containing two driver belts which act upon the tow and pull it through the coating apparatus.

The tow is then passed through a small oven having a temperature of 400°-500° F. which acts to raise the tow temperature above the softening point of the latex to avoid breakage of the latex upon cutting. Upon emerging from the oven, the tow is cut into elongated pellet or granules having a length of about ¼ inches. Each granule contains about 38% wt of latex.

The granules are then incorporated into a polycarbonate resin such that the content of the fibers in the article so produced is about 8.5 wt. %. An Electro-Metrics Dual Chamber test fixture is then used in accordance with ASTM E57-83 to measure the shielding effectiveness (SE) of the article.

It is found that the article has an SE of 59 decibels at 1000 MHz.

EXAMPLE II

The procedure of Example I is repeated except that monomers used are sty, mma and ea in a ratio of 23:72:5, respectively and the granules produced are found to contain about 17.9 wt. % of the latex. An article produced therefrom in polycarbonate has an SE of about 59 to 1000 MHz.

EXAMPLE III

The procedure of Example I is repeated except that the monomers used are sty, mma, bma and maa in a ratio of 58.6:32.9:7.5:1.0, respectively, and the granules contain about 43 wt. % of latex.

An article produced therefrom in polycarbonate possesses an SE of about 52 decibels at 1000 MHz.

EXAMPLE IV

The procedure of Example I is repeated except the monomers used were sty, maa, ba and mma in a ratio of 57:32:10:1, respectively and the granules were found to have a latex content of about 36 wt. %.

An article produced therefrom in polycarbonate is found to have an SE of about 51 decibels at 1000 MHz.

EXAMPLE V

The procedure of Example I is repeated except that the fibers contain 40 wt. % nickel, the monomers are used in a ratio of about 44:25:30:1 by weight, and the granules contain about 38% latex.

An article produced therefrom in polycarbonate is found to have an SE of about 64 at 1000 MHz.

We claim:

1. Molding granules convertible to a molded article through use in conjunction with a molding resin, said granules comprising a bundle of elongated electrically non-conductive reinforcing fibers extending generally parallel to each other longitudinally within the granule and a film forming latex binder composition, the latex composition substantially surrounding each fiber within said bundle, wherein said latex is selected from the group consisting of:
   (i) styrene/methylmethacrylate/butyl acrylate/methacrylic acid wherein the styrene content ranges from about 40 to about 60 wt. %, and methylmethacrylate content ranges from about 20 to about 45 wt. %, the butylacrylate content ranges from about 1 to about 35 wt. % and the methacrylic acid content ranges from about 0.1 to about 2.0 wt. %;
   (ii) styrene/methylmethacrylate/ethyl acrylate wherein the styrene content ranges from about 18 to about 30 wt. %, the methylmethacrylate content ranges from about 65 to about 77 wt. % and the ethylacrylate content ranges from about 2 to about 8 wt. %; and
   (iii) methylmethacrylate/butylacrylate/methacrylic acid wherein the methylmethacrylate content ranges from about 50 to about 70 wt. %, the butylacrylate content ranges from about 30 to about 40 wt. % and the methacrylic acid content ranges from about 1 to about 5 wt. %.

2. The granules of claim 1 wherein the fibers comprises glass fibers, aramid fibers, or mixtures thereof.

3. The granules of claim 2 wherein said latex of group (i) comprises about 54 wt. % styrene, about 42 wt. % of methylmethacrylate, about 2.5 of butylacrylate and about 0.5 wt. % of methacrylic acid.

* * * * *